(12) United States Patent
Yokoyama

(10) Patent No.: US 9,530,953 B2
(45) Date of Patent: Dec. 27, 2016

(54) VIBRATION-TYPE ACTUATOR, IMAGE PICKUP APPARATUS, AND STAGE

(71) Applicant: CANON KABUSHIKI KAISHA, Tokyo (JP)

(72) Inventor: Daisuke Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 13/938,438

(22) Filed: Jul. 10, 2013

(65) Prior Publication Data
US 2014/0016014 A1    Jan. 16, 2014

(30) Foreign Application Priority Data

Jul. 11, 2012  (JP) ................................ 2012-155513

(51) Int. Cl.
| H02N 2/00 | (2006.01) |
| H01L 41/04 | (2006.01) |
| H04N 5/232 | (2006.01) |
| H02N 2/10 | (2006.01) |

(52) U.S. Cl.
CPC ............ *H01L 41/04* (2013.01); *H02N 2/0015* (2013.01); *H02N 2/103* (2013.01); *H04N 5/232* (2013.01); *G03B 2205/0061* (2013.01); *G03B 2205/0084* (2013.01)

(58) Field of Classification Search
USPC .................. 310/311, 323.01, 323.02, 323.05, 323.09, 310/324, 328
See application file for complete search history.

(56) References Cited

U.S. PATENT DOCUMENTS

| 4,273,399 | A | * | 6/1981 | Myers et al. ................... 439/74 |
| 4,794,294 | A | | 12/1988 | Shimizu et al. |
| 4,965,483 | A | * | 10/1990 | Abe et al. ...................... 310/324 |
| 5,173,631 | A | | 12/1992 | Suganuma |
| 5,438,229 | A | | 8/1995 | Ohtsuchi |
| 5,461,273 | A | | 10/1995 | Kawasaki et al. |
| 5,493,164 | A | | 2/1996 | Nogarede |
| 5,872,416 | A | | 2/1999 | Nogarede |
| 7,439,650 | B2 | | 10/2008 | Sawada |
| 8,339,016 | B2 | | 12/2012 | Seki et al. |
| 8,760,036 | B2 | * | 6/2014 | Kojima .................... 310/323.02 |
| 8,791,623 | B2 | * | 7/2014 | Tani ............................. 310/328 |
| 8,816,568 | B2 | * | 8/2014 | Seki et al. ............... 310/323.16 |
| 2002/0095226 | A1 | | 7/2002 | Suzuki |
| 2002/0155804 | A1 | | 10/2002 | Poutot et al. |
| 2003/0015982 | A1 | | 1/2003 | Cox-Smith |

(Continued)

FOREIGN PATENT DOCUMENTS

| CN | 1892187 A | 1/2007 |
| EP | 0610836 A2 | 8/1994 |

(Continued)

OTHER PUBLICATIONS

U.S. Appl. No. 13/989,144, filed May 23, 2013, Jun Sumioka.

*Primary Examiner* — Thomas Dougherty
(74) *Attorney, Agent, or Firm* — Canon U.S.A., Inc. IP Division

(57) ABSTRACT

A vibration-type actuator includes a supporting mechanism functioning such that a reaction force from a base against a pressing force from a driven member to an elastic member is dispersed to a vibrating portion and a supported portion of the elastic member. The supported portion is supported by the base with a vibration-isolating member interposed therebetween.

20 Claims, 17 Drawing Sheets

(56) References Cited

U.S. PATENT DOCUMENTS

| | | |
|---|---|---|
| 2005/0067921 A1 | 3/2005 | Yamamoto |
| 2006/0119218 A1* | 6/2006 | Doshida et al. ......... 310/323.01 |
| 2007/0145926 A1 | 6/2007 | Egami et al. |
| 2007/0188048 A1 | 8/2007 | Nagahama et al. |
| 2007/0188050 A1* | 8/2007 | Hashimoto .............. 310/323.02 |
| 2008/0212415 A1 | 9/2008 | Nagao |
| 2010/0117568 A1 | 5/2010 | Iwashita |
| 2012/0020187 A1 | 1/2012 | Kunita |
| 2013/0032671 A1 | 2/2013 | Giles |
| 2013/0293728 A1* | 11/2013 | Ohashi ..................... 348/208.11 |
| 2013/0334989 A1 | 12/2013 | Kataoka |

FOREIGN PATENT DOCUMENTS

| | | |
|---|---|---|
| EP | 0966049 A1 | 12/1999 |
| JP | S59-033415 A | 2/1984 |
| JP | S59-132755 A | 7/1984 |
| JP | 64-34184 A | 2/1989 |
| JP | H06-284755 A | 10/1994 |
| JP | H07-039179 A | 2/1995 |
| JP | 2000-23475 A1 | 1/2000 |
| JP | 3060081 | 7/2000 |
| JP | 2001-224188 A | 8/2001 |
| JP | 2001-231274 A | 8/2001 |
| JP | 2003325508 A | 11/2003 |
| JP | 2004-023863 A | 1/2004 |
| JP | 2004-320846 A | 11/2004 |
| JP | 2010-158127 A | 7/2010 |
| JP | 2011-200053 A | 10/2011 |
| JP | 2012-005309 A | 1/2012 |

* cited by examiner

VIBRATION-TYPE ACTUATOR, IMAGE PICKUP APPARATUS, AND STAGE

BACKGROUND OF THE INVENTION

Field of the Invention

The present invention relates to a vibration-type actuator, and an image pickup apparatus and a stage each including the same.

Description of the Related Art

There are various vibration-type actuators (for example, an oscillatory wave motor) in each of which a driven member is driven with vibrations generated in an elastic member. In an oscillatory wave motor, a vibrator including an electromechanical energy conversion element (such as a piezoelectric element) and an elastic member (mostly, a metal elastic member) that is bonded to the electromechanical energy conversion element is excited to vibrate in a plurality of vibration modes. With the combination of the plurality of vibration modes, the surface of the elastic member undergoes an elliptic movement, whereby the driven member that is in contact with the elastic member is driven relative to the elastic member. Various kinds of such oscillatory wave motors have been proposed. For example, known oscillatory wave motors that rotationally drive lens barrels included in cameras and the like include a ring-shaped oscillatory wave motor, a bar-type rotary oscillatory wave motor, and so forth. Many other motors with improvements in their configurations or forms have also been proposed, such as an oscillatory wave motor in the form of a rotary actuator that includes a plurality of flat-plate elastic members each having a thin-plate vibrating portion and a projecting portion, the elastic members being arranged along the circumference of the motor. In addition, many vibration-type linear actuators have been proposed in each of which a flat-plate elastic member, such as the one described above, is provided in contact with a linear slider in such a manner as to be driven linearly.

An outline of an exemplary oscillatory wave motor, disclosed by Japanese Patent Laid-Open No. 2011-200053, including a flat-plate elastic member will now be described. The oscillatory wave motor includes a vibrator and a slider that is in contact with the vibrator. The vibrator includes an elastic member and a piezoelectric element. The piezoelectric element is bonded to the elastic member with adhesive or the like. The elastic member includes a vibrating portion that vibrates together with the piezoelectric element, a supported portion that is substantially insulated from vibration generated in the vibrating portion, and a connecting portion that connects the vibrating portion and the supported portion to each other, the connecting portion functioning such that one end thereof follows the vibration of the vibrating portion while the other end thereof suppresses the transmission of the vibration to the supported portion. The vibrating portion has, on one surface thereof, two projecting portions via which the vibration is transmitted to a driven member. When alternating-current electric fields with different phases are applied to the piezoelectric element, the vibrator is excited to generate two kinds of out-of-plane bending vibrations, whereby the tips of the two projecting portions each undergo an elliptic movement. Consequently, the slider that is in contact with the projecting portions receives a frictional driving force and is thus driven in one direction.

Meanwhile, Japanese Patent Laid-Open No. 64-34184 discloses an ultrasonic motor in which the entirety of a vibrator is supported by a supporting member with vibration-isolating members interposed therebetween, whereby the loss of vibrational energy is reduced.

SUMMARY OF THE INVENTION

In Japanese Patent Laid-Open No. 2011-200053, a pressing force is applied to the driven member and the vibrator by utilizing magnetism. From the viewpoints of cost reduction and so forth, a configuration, such as the one illustrated in FIG. 16, including springs for application of a pressing force may be employed. In the configuration illustrated in FIG. 16, only supported portions 105 are supported by a base 132. Therefore, an elastic member 102 receives bending stresses acting in direction A under pressing forces (acting in direction B) generated by leaf springs 106 and applied thereto from a driven member 131. The bending stress may act as a force that separates a piezoelectric element 103 and the elastic member 102, which are bonded to each other, from each other. Hence, considering the service environment, the number of available kinds of adhesive is strictly limited, leading to a cost increase in some cases. In the ultrasonic motor disclosed by Japanese Patent Laid-Open No. 64-34184, a stator unit functioning as a vibrating portion is supported by the supporting member with the vibration-isolating members functioning as vibration absorbers interposed therebetween. In such a configuration, a portion substantially insulated from vibration and functioning as a supported portion cannot receive a pressing force from a driven member, resulting in a great loss of vibrational energy.

One aspect of the present invention relates to a vibration-type actuator in which the occurrence of separation of an elastic member and a piezoelectric element from each other is suppressed. Another aspect of the present invention relates to a vibration-type actuator in which the loss of vibrational energy is reduced.

For example, according to the one aspect of the present invention, a vibration-type actuator includes an electromechanical energy conversion element; an elastic member including a vibrating portion to which the electromechanical energy conversion element is bonded, a supported portion provided on a base, and a connecting portion connecting the vibrating portion and the supported portion to each other; and a first member having a spring characteristic and provided between the vibrating portion and the base.

In the present invention, a vibrating portion refers to a portion of an elastic member that vibrates together with an electromechanical energy conversion element.

Furthermore, in the present invention, a vibrator comprises at least an electromechanical energy conversion element and an elastic member, and the vibrator generates mechanical vibrations when a voltage is applied to the electromechanical energy conversion element.

Furthermore, in the present invention, a driven member moves relative to a vibrator when the vibrator vibrates. The relative movements of the vibrator and the driven member are realized not only when the driven member moves while the vibrator is fixed but also when the vibrator moves while the driven member is fixed.

The vibration-type actuator according to the present invention includes at least a vibrator. For example, the vibration-type actuator may include a vibrator and a supporting mechanism that supports the vibrator. For another example, the vibration-type actuator may include the vibrator, the supporting mechanism, and a base.

Further features of the present invention will become apparent from the following description of exemplary embodiments with reference to the attached drawings.

DESCRIPTION OF THE EMBODIMENTS

First Embodiment

Figure 1A:
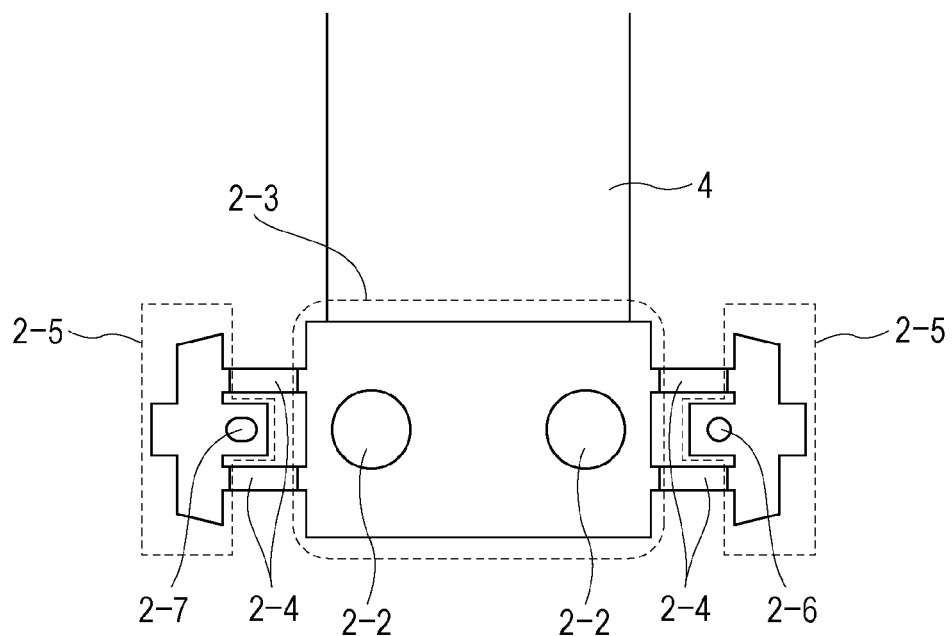
FIGS. 1A and 1B illustrate a vibrator.
Figure 1B:
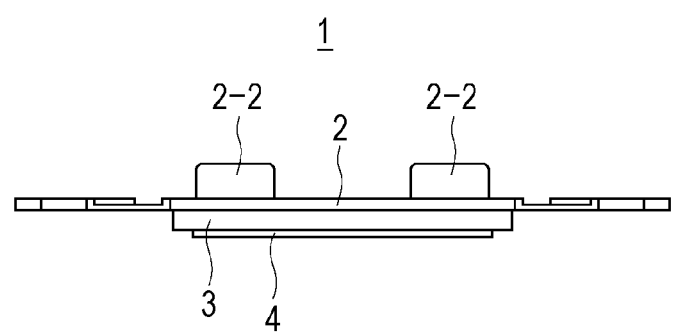

A first embodiment of the present invention will now be described with reference to FIGS. 1A to 12. FIGS. 1A and 1B illustrate a configuration of a vibrator that is common to all embodiments of the present invention. A vibrator 1 includes an elastic member 2 and an electromechanical energy conversion element such as a piezoelectric element 3 that is bonded to the elastic member 2. Herein, the vibrator 1 is a flat-plate vibrator. A flexible printed-circuit board (FPC) 4 is connected to the piezoelectric element 3 and supplies power to the piezoelectric element 3. The piezoelectric element 3 is bonded to the elastic member 2. The elastic member 2 includes a vibrating portion 2-3 that vibrates together with the piezoelectric element 3, supported portions 2-5 that are substantially insulated from vibration that occurs in the vibrating portion 2-3, and connecting portions 2-4 that each connect the vibrating portion 2-3 and a corresponding one of the supported portions 2-5 to each other. The connecting portions 2-4 each function such that one end thereof follows the vibration of the vibrating portion 2-3 while the other end thereof suppresses the transmission of the vibration to the corresponding supported portion 2-5. The vibrating portion 2-3 has projecting portions 2-2 functioning as frictional contact portions on a surface thereof opposite a surface thereof bonded with the piezoelectric element 3. One of the supported portions 2-5 has a circular hole 2-6, and the other supported portion 2-5 has an oblong hole 2-7. The holes 2-6 and 2-7 are to be fitted onto respective pins 8 (see FIGS. 13 to 15 and to be described below), whereby the position of the flat-plate vibrator 1 in the planar direction is regulated. In the first embodiment, the holes 2-6 and 2-7 may be used as positioning members to be used in an assembly process but are not necessary at this stage.

Figure 2:
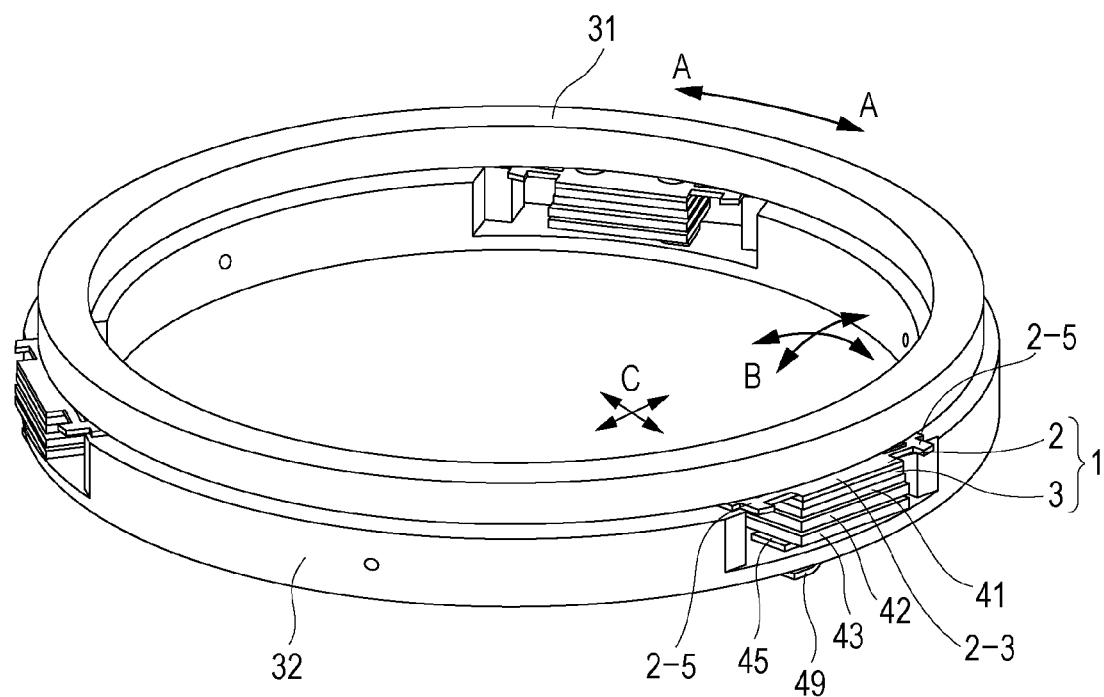
FIG. 2 is a perspective view of a vibration-type actuator illustrating major elements thereof.
Figure 3:
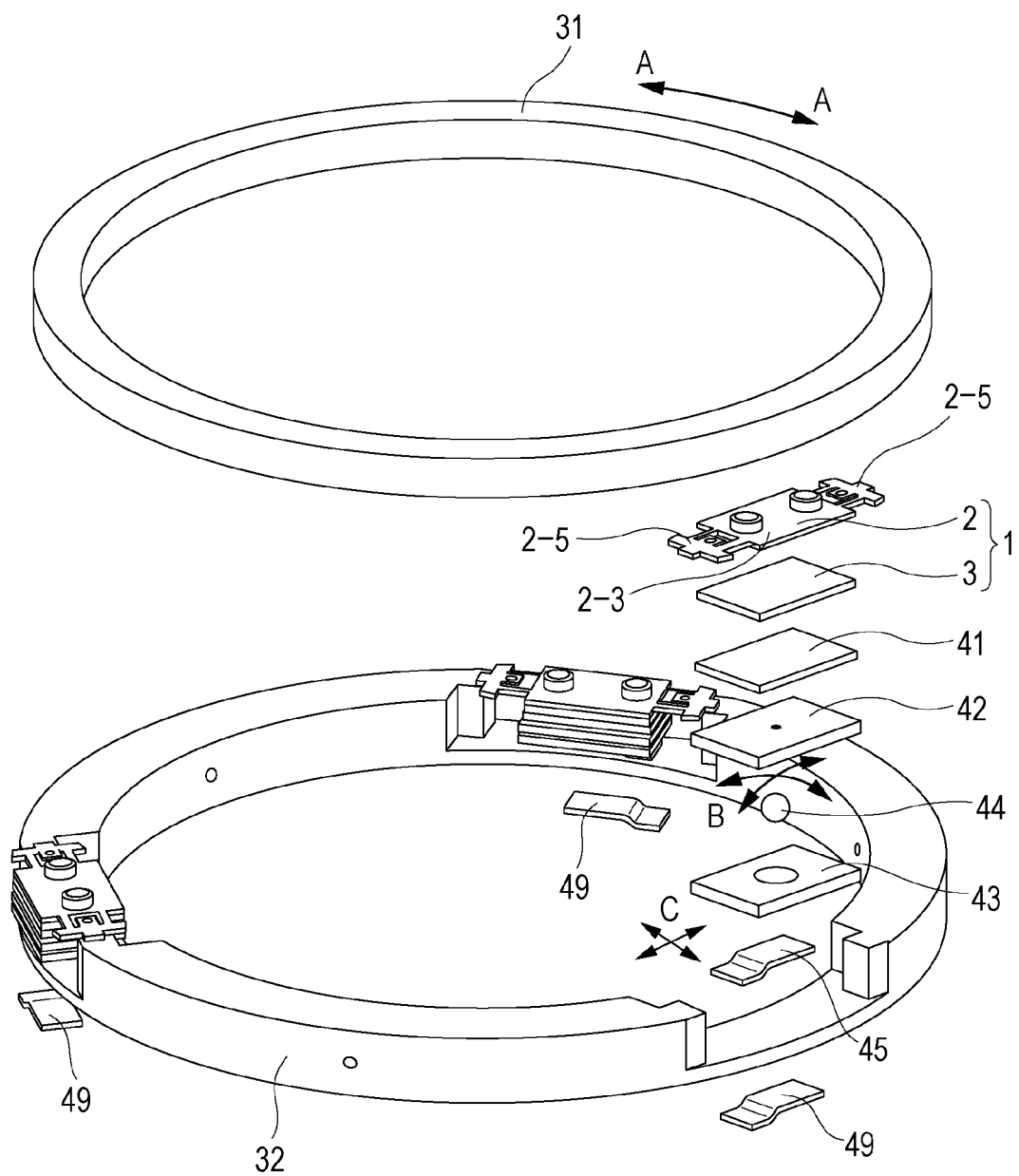
FIG. 3 is a partially exploded perspective view of the vibration-type actuator illustrated in FIG. 2.

FIG. 2 is a perspective view of a vibration-type actuator according to the first embodiment illustrating major elements thereof. FIG. 3 is a partially exploded perspective view of the ultrasonic motor illustrated in FIG. 2. In the first embodiment, three sets of flat-plate vibrators 1 and supporting mechanisms that support the respective vibrators 1 are arranged annularly, and a driven member 31 is driven in directions A-A. As illustrated in FIGS. 2 and 3, a base 32 has recesses, in each of which the vibrating portion 2-3 of a corresponding one of the flat-plate vibrators 1 (the FPC 4 is not illustrated) is provided. The supported portions 2-5 of each flat-plate vibrator 1 are fixed to the upper surface of the base 32 by welding, bonding, screwing, or the like. The vibrating portion 2-3 of the flat-plate vibrator 1 is supported by an equalizing plate 42 with a felt member 41 interposed therebetween. The felt member 41 suppresses the transmission of vibration from the flat-plate vibrator 1 to the equalizing plate 42 and members provided nearer to the base 32 with respect to the equalizing plate 42, whereby the loss of vibrational energy is reduced. The equalizing plate 42 is provided on another equalizing plate 43 with a ball member 44 interposed therebetween. The equalizing plate 43 is supported by the base 32 with a Z-shaped leaf spring 45 interposed therebetween. A lower portion of the leaf spring 45 is fixed to the upper surface of the base 32. An upper portion of the leaf spring 45 is fixed to the lower surface of the equalizing plate 43. The leaf spring 45 is provided so as to facilitate the setting of a reaction force acting on the vibrating portion 2-3 against a pressing force (to be described below) from the driven member 31 to a desired value. The lower surface of the equalizing plate 42 and the upper surface of the equalizing plate 43 have conical grooves, respectively. The ball member 44 fits in the conical grooves, whereby the movement of the equalizing plate 42 in planar directions (directions C) is regulated while the equalizing plate 42 and the felt member 41 are equalized in directions B, illustrated in FIGS. 2 and 3, with respect to the equalizing plate 43. In FIG. 2, directions B, which are represented by two double-headed arrows intersecting at 90 degrees, include all directions defined by an arrow pivoted about a vertical axis by 360 degrees. The driven member 31 includes a frictional contact portion on one of the two surfaces thereof. The frictional contact portion has undergone an anti-abrasion process. The driven member 31 is provided such that the frictional contact portion thereof faces and is in contact with the upper surfaces of the projecting portions 2-2, which function as frictional contact surfaces of the flat-plate vibrator 1. The flat-plate vibrators 1 and the driven member 31 receive appropriate pressing forces that are applied by three leaf springs 49 and guide members (not illustrated) for the driven member 31.

Figure 4:
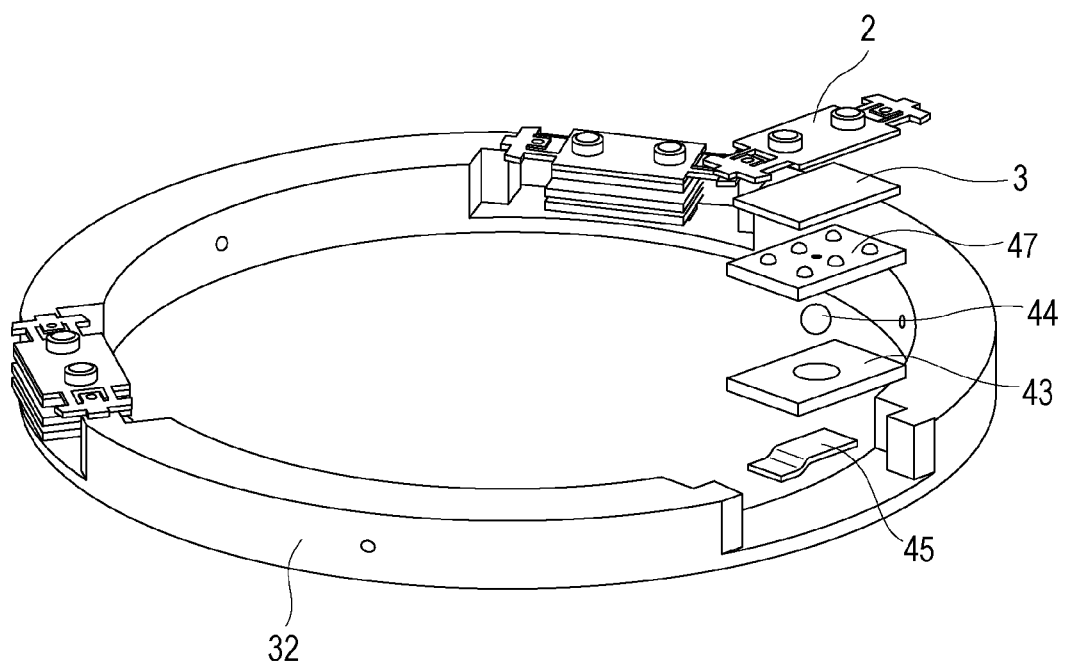
FIG. 4 illustrates a vibration-type actuator including a vibration-isolating plate as a substitute for a felt member included in the configuration illustrated in FIGS. 2 and 3.

FIG. 4 illustrates a configuration including the base 32 and the members provided on the base 32 that are the same as those illustrated in FIGS. 2 and 3 excluding the felt member 41, which is substituted by a vibration-isolating plate 47. The function of this configuration is the same as that of the configuration illustrated in FIGS. 2 and 3. The vibration-isolating plate 47 has projections on a surface thereof facing the piezoelectric element 3. The projections provide point supports that support the piezoelectric element 3 at respective positions where the vibration of the piezoelectric element 3 becomes minimum. The positions where the vibration becomes minimum include not only positions where the vibration becomes exactly minimum but also positions where the vibration falls within a range including the minimum value and errors with respect thereto that may occur in the manufacturing process and during use. In this case, the positions where the vibration becomes minimum are the intersections between nodal lines 11 and 12 and nodal lines 13, 14, and 15 (to be described below referring to FIG. 12). The material for the vibration-isolating plate 47 may be resin, in terms of vibration isolation, but is not limited thereto. The vibration-isolating plate 47 also functions as the equalizing plate 42 and has a conical groove provided in a surface thereof opposite a surface thereof having the projections. The ball member 44 fits in the conical groove.

Figure 5:
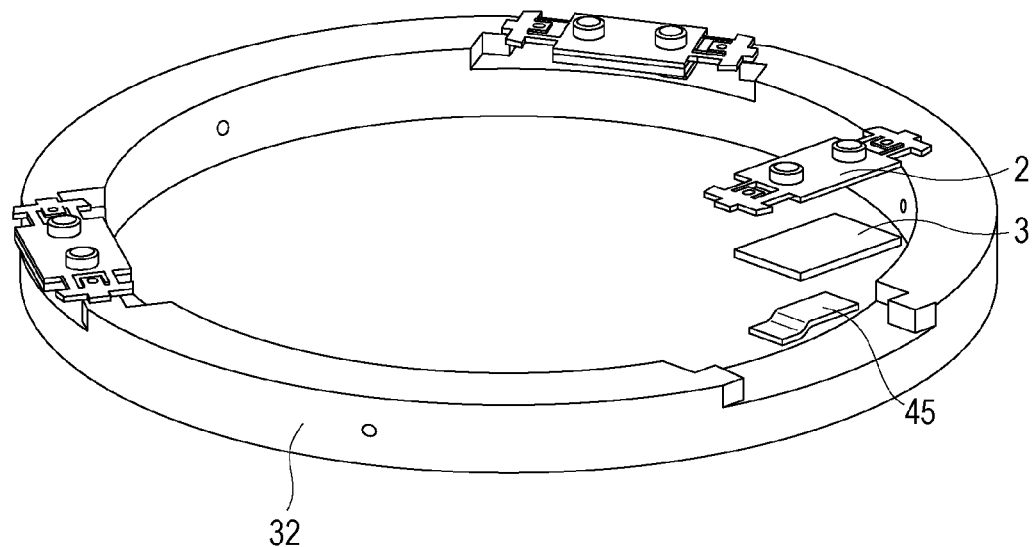
FIG. 5 illustrates a modification of the vibration-type actuator.
Figure 6:
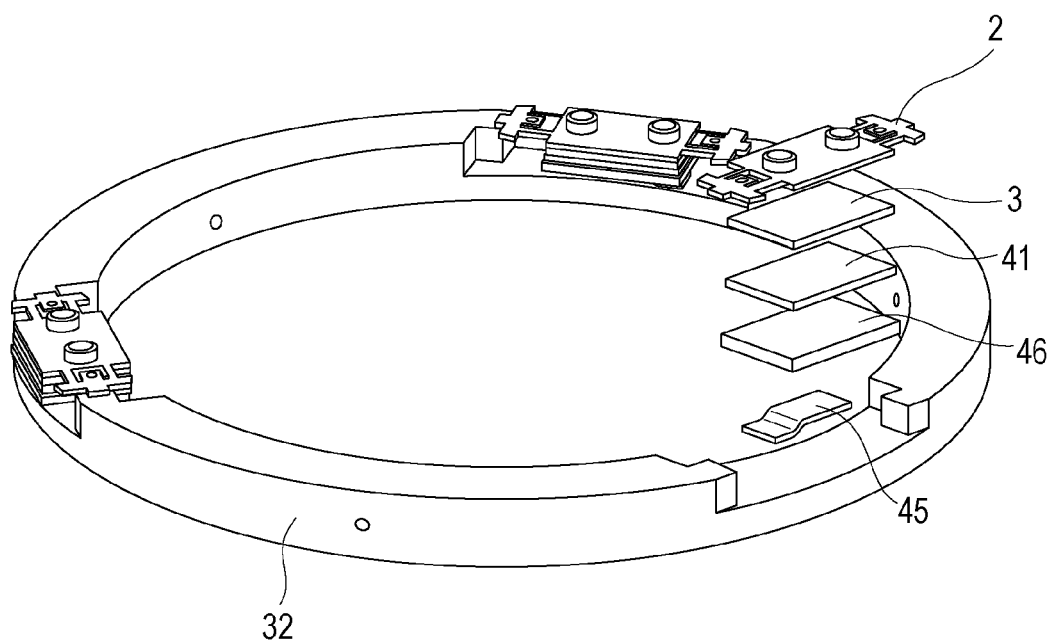
FIG. 6 illustrates another modification of the vibration-type actuator.
Figure 7:
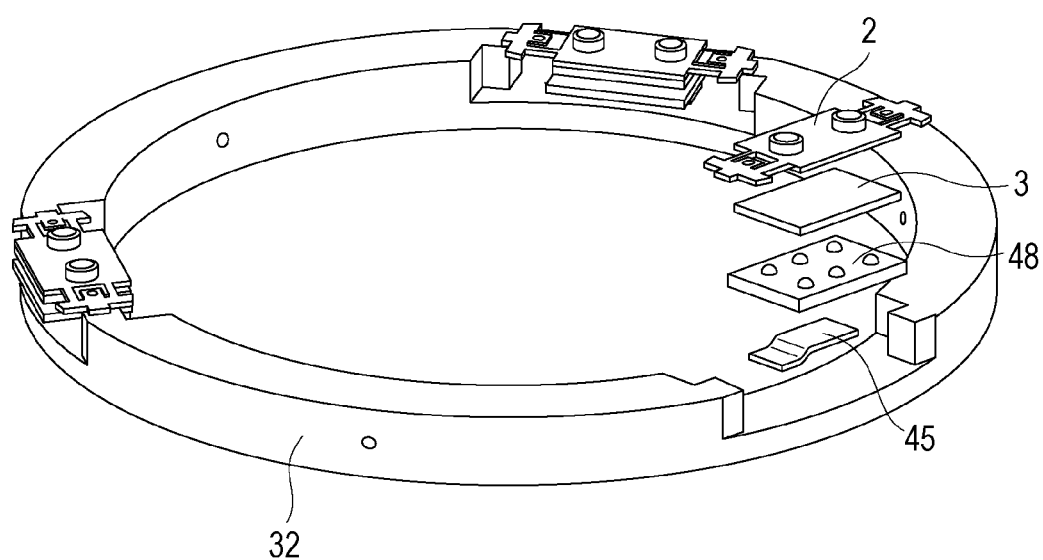
FIG. 7 illustrates yet another modification of the vibration-type actuator.
Figure 8:
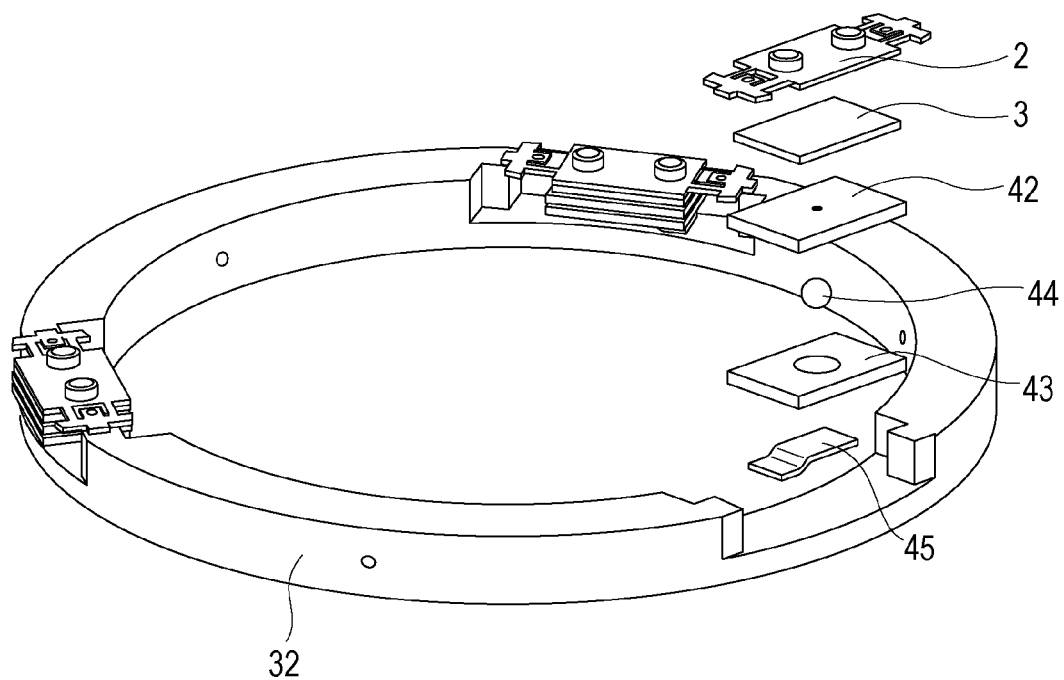
FIG. 8 illustrates yet another modification of the vibration-type actuator.
Figure 9:
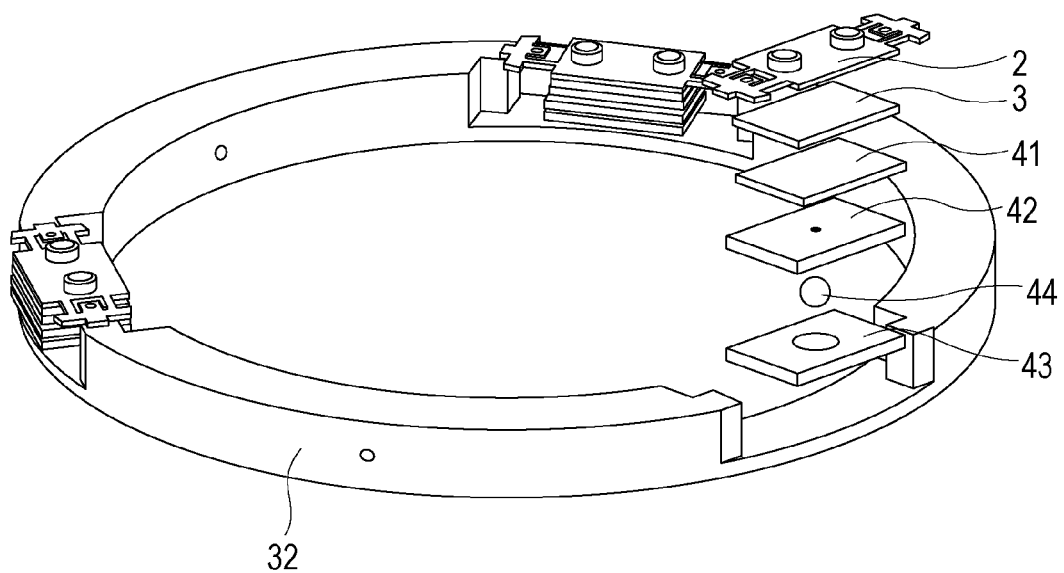
FIG. 9 illustrates yet another modification of the vibration-type actuator.
Figure 10:
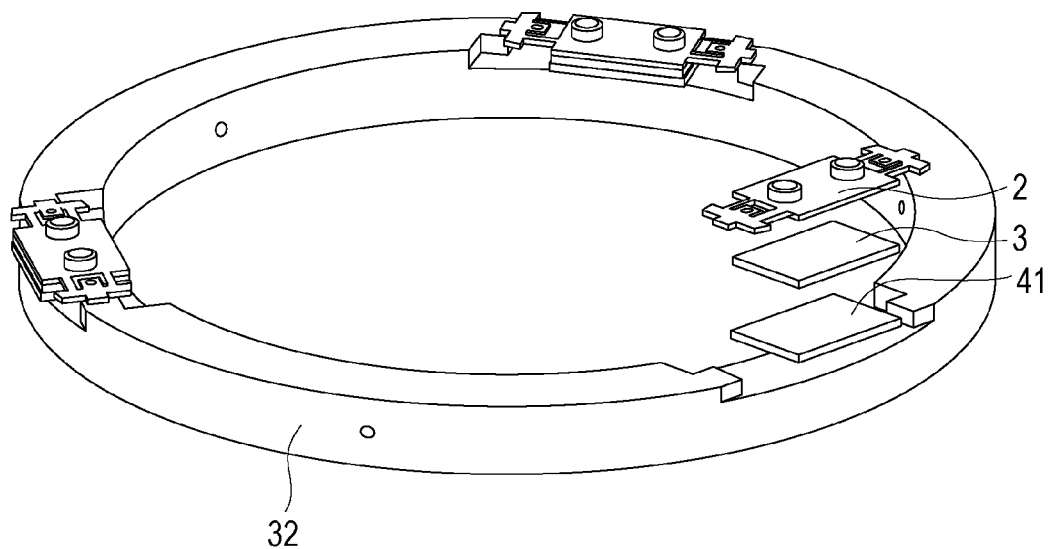
FIG. 10 illustrates yet another modification of the vibration-type actuator.

As described above, the vibration-type actuator according to the first embodiment includes any spring elements as supporting mechanisms that support each vibrating portion 2-3. The vibration-type actuator according to the first embodiment may further include any vibration-isolating elements. For example, the vibration-type actuator according to the first embodiment may include any members having spring characteristics as spring elements (for example, the leaf spring 45 and the felt member 41), and any members having vibration-isolating characteristics as vibration-isolating elements (for example, the felt member 41 and the vibration-isolating plate 47). The vibration-type actuator according to the first embodiment may further include any equalizers (for example, the equalizing plates 42 and 43 and the ball member 44) as equalizing elements that cause the reaction force acting against the pressing force from the vibration-isolating elements and/or the spring elements to be applied straight to the vibrator. The equalizers adjust the orientations of the elastic member 2 and the piezoelectric element 3 so that the vibrator 1 extends along and is in contact with the contact surface of the driven member 31 under the pressing force and the reaction force. The felt member 41 functions as both a member having a vibration-isolating characteristic and a member having a spring characteristic. Therefore, if the felt member 41 is employed, the member having a spring characteristic may be omitted in terms of design. If the motor is not required to have very high energy efficiency, the members having vibration-isolating characteristics are not necessarily provided. If the supporting mechanism can be manufactured with high accuracy and the reaction force acting on the vibrating portion 2-3 is applied straight to the elastic member 2, the equalizers are not necessarily provided. Considering the above, the supporting mechanism that supports the vibrating portion 2-3 according to the first embodiment may be modified as illustrated in FIGS. 5 to 10. FIGS. 5, 6, and 7 illustrate supporting mechanisms including no equalizers. FIG. 8 illustrates a supporting mechanism including no vibration-isolating members. FIG. 9 illustrates a supporting mechanism that includes a felt member also functioning as a member having a spring characteristic. FIG. 10 illustrates a supporting mechanism that includes a felt member also functioning as a member having a spring characteristic but includes no equalizers. These supporting mechanisms are obtained by omitting any of the elements that are omittable from any of the supporting mechanisms illustrated in FIGS. 2, 3, and 4 in accordance with the above guidelines. Among such configurations, the best one may be selected as the supporting mechanism by considering all the factors including the required accuracy, allowable space, manufacturing cost, and so forth concerning the supporting member. Some of the above modifications of the supporting mechanism include the following two elements that are not included in the configurations illustrated in FIGS. 2, 3, and 4. One is a felt-member-supporting plate 46 that supports the felt member 41. In the configuration illustrated in FIG. 3, the equalizing plate 42 also functions as the felt-member-supporting plate 46. Since the configuration illustrated in FIG. 6 does not include the equalizing plate 42, the configuration requires the felt-member-supporting plate 46. The other is a vibration-isolating plate 48 having no conical groove. In the configuration illustrated in FIG. 4, the vibration-isolating plate 47 also functions as the equalizing plate 42. Since the configuration illustrated in FIG. 7 includes no equalizing elements, the conical groove is omitted.

In the first embodiment, the reaction force acting against the pressing force from the driven member 31 is made to disperse into the vibrating portion 2-3 and the supported portions 2-5 of the vibrator 1. In a case where no spring elements are included in the supporting mechanism that supports the vibrating portion 2-3, if the relative difference between the level of the supporting surface of the vibrating portion 2-3 and the level of the supporting surfaces of the supported portions 2-5 varies because of manufacturing errors, the reaction force acting from the base 32 toward the vibrating portion 2-3 and the supported portions 2-5 may also vary among the different sets of the flat-plate vibrators 1 and the supporting mechanisms. Hence, the modifications of the supporting mechanism that support the vibrating portion 2-3 that are illustrated in FIGS. 5 to 10 all include any members having spring characteristics. If the above relative difference between the supporting surfaces is adjusted with high accuracy, the supporting mechanism that supports the vibrating portion 2-3 does not necessarily include members having spring characteristics.

Figure 11:
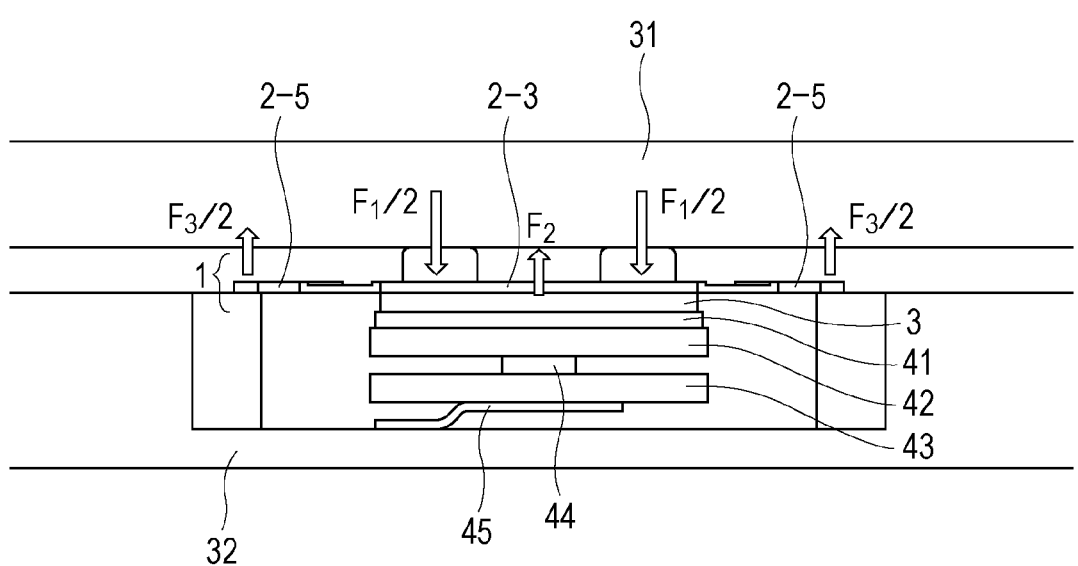
FIG. 11 illustrates forces applied to the vibrator.

FIG. 11 illustrates forces acting on the flat-plate vibrator 1 (the gravitational force is ignored). The flat-plate vibrator 1 receives a pressing force F1 from the driven member 31, the vibrating portion 2-3 receives a reaction force F2 from the base 32, and the supported portions 2-5 together receive a reaction force F3 from the base 32. The lower limit of the reaction force F2 at which the piezoelectric element 3 remains bonded to the elastic member 2 is denoted by F0. In the first embodiment, the dimensions of the supporting mechanism and the spring constant of the leaf spring 45 are set such that a relationship of $F3 \leq F1-F0$ is satisfied. The lower limit F0 is experimentally obtained in advance. The relationship of $F3 \leq F1-F0$ applies to all of the embodiments of the present invention.

Figure 12:
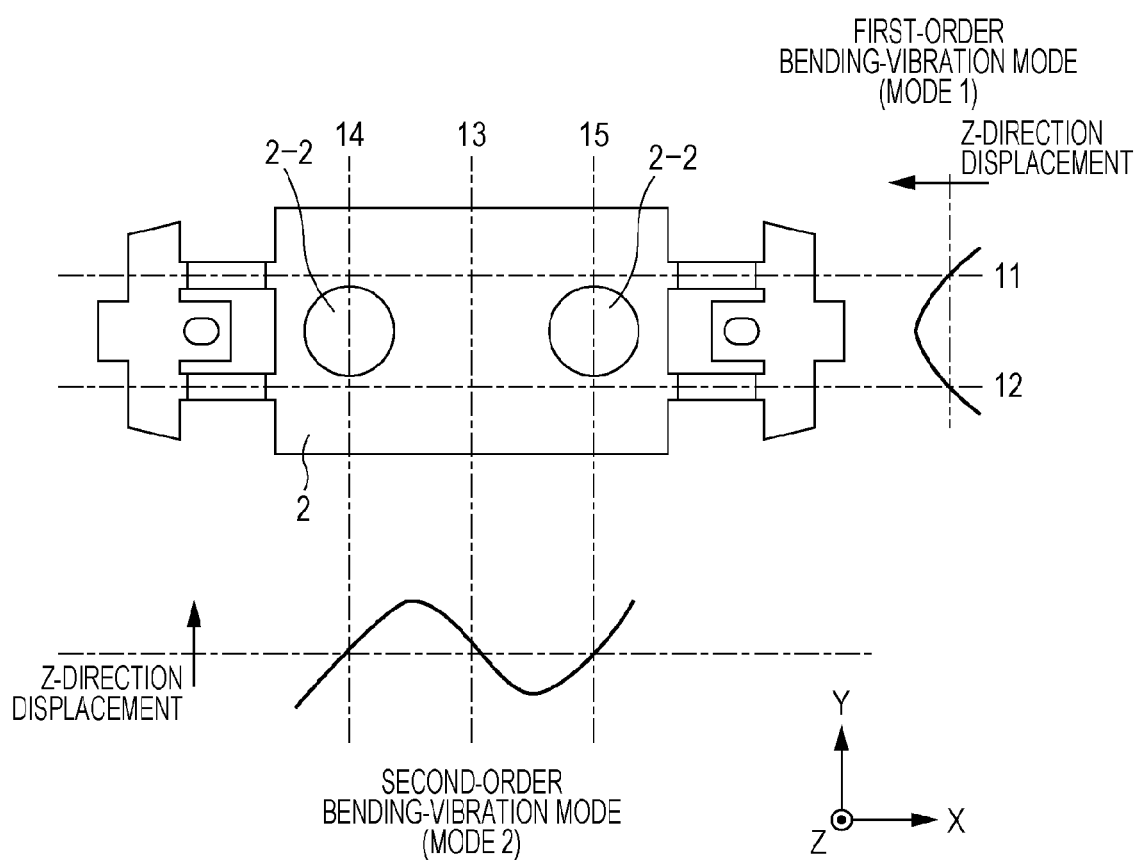
FIG. 12 illustrates modes of vibrations occurring in the vibrator.

When an alternating-current electric field is applied from the FPC 4 to the piezoelectric element 3, the flat-plate vibrator 1 is excited to vibrate in a first vibration mode (mode 1) and a second vibration mode (mode 2) as illustrated in FIG. 12. Mode 1 is, for example, a first-order out-of-plane bending vibration mode occurring in the short-side direction of the flat-plate vibrator 1. The vibration in mode 1 has two nodal lines (linear portions where vibration nodes reside) 11 and 12 extending in a direction orthogonal to the short-side direction of the flat-plate vibrator 1 in FIG. 12, with a vibration loop appearing at the midpoint between the nodal lines 11 and 12. Mode 2 is, for example, a second-order out-of-plane bending vibration mode occurring in the long-side direction of the flat-plate vibrator 1. The vibration in mode 2 has three nodal lines 13, 14, and 15 that are orthogonal to the two nodal lines 11 and 12. As illustrated in FIG. 12, the projecting portions 2-2 are provided around positions where the respective nodal lines 14 and 15 pass through. Therefore, at the tips (upper surfaces) of the projecting portions 2-2, when the vibration in mode 2 is generated, the amplitude of vibration in the Z direction is substantially zero while only a certain amplitude of vibration in the X direction occurs. Meanwhile, at the tips of the projecting portions 2-2, when the vibration in mode 1 is generated, the amplitude of vibration in the X direction is substantially zero while the amplitude of vibration in the Z direction becomes maximum. Hence, if the vibrations in the two respective modes are generated simultaneously and are combined together while the phases thereof are appropriately adjusted, the projecting portions 2-2 of the elastic member 2 undergo elliptic movements. When the driven member 31 illustrated in FIG. 2 is brought into contact with the projecting portions 2-2 in such a state, the driven member 31 is driven in directions A-A with a frictional force produced by the elliptic movements.

As described above, the vibration-type actuator according to the first embodiment includes the supporting mechanism functioning such that the reaction force from the base against the pressing force from the driven member to the elastic member is dispersed to the vibrating portion and the supported portion of the vibrator. Therefore, a separating force applied to a bonding layer provided between the elastic member and the piezoelectric element is smaller than in a supporting mechanism in which the reaction force acts only on the supported portion. Furthermore, the loss of vibrational energy is smaller than in a supporting mechanism in which the reaction force acts only on the vibrating portion. Furthermore, from the viewpoints of bond separation and the loss of vibrational energy, the best design of the reaction force acting on the vibrating portion and the supported portion is realized.

Although the first embodiment concerns a case where three vibrators are provided on the base, the present invention is not limited to such an embodiment. One or two vibrators or four or more vibrators may be provided on the base. Moreover, vibrators may be arranged such that the vibration-type actuator performs linear driving (in which the driven member undergoes a linear movement relative to the vibration-type actuator).

Second Embodiment

Figure 13:
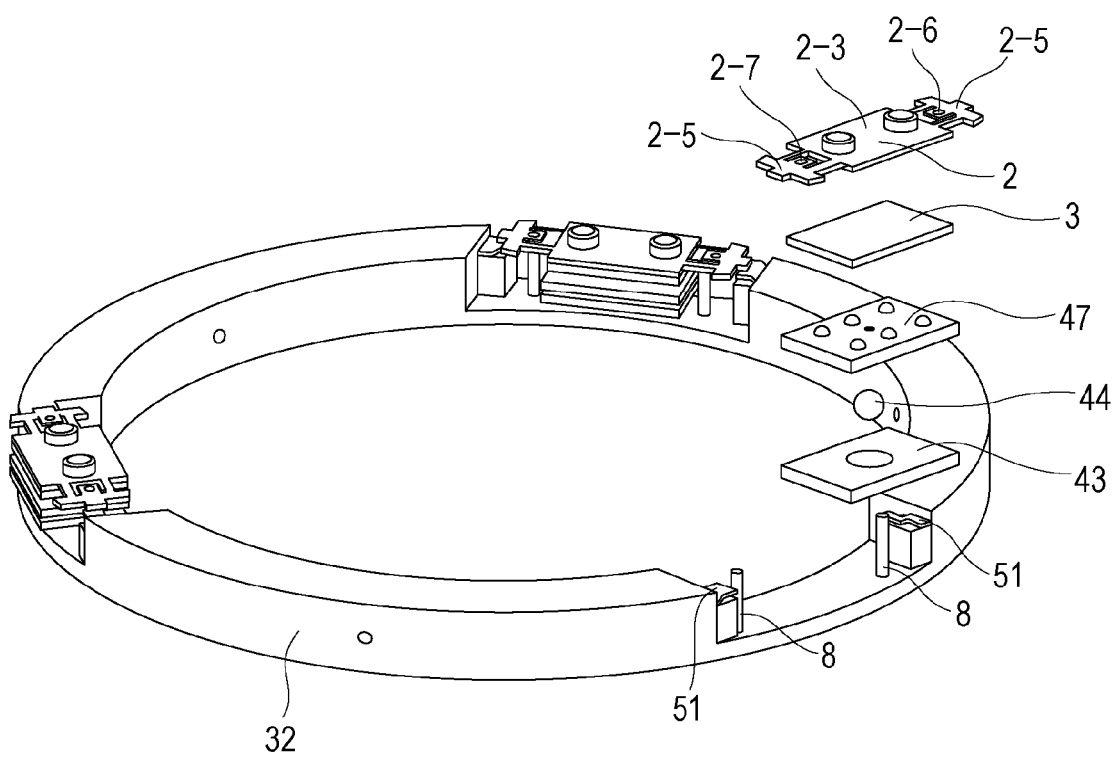
FIG. 13 illustrates another vibration-type actuator.

A second embodiment of the present invention will now be described with reference to FIG. 13. In the first embodiment, the supported portions 2-5 of the flat-plate vibrator 1 is fixed to the base 32. In the second embodiment, as illustrated in FIG. 13, the supported portions 2-5 as members having a spring characteristic are supported by the base 32 with leaf springs 51 interposed therebetween. The leaf springs 51 are fixed to the base 32 and support the supported portions 2-5 of the flat-plate vibrator 1. The circular hole 2-6 and the oblong hole 2-7 provided in the elastic member 2 are fitted onto the respective pins 8 standing from the base 32, whereby the position of the flat-plate vibrator 1 in the planar direction is regulated. Hence, the pins 8 function as position-regulating members that regulate the position of the elastic member. The supported portions 2-5 is not necessarily fixed to the leaf springs 51. If the supported portions 2-5 and the leaf springs 51 are fixed to the base 32, the pins 8 are no longer necessary. The elastic member 2 and the leaf springs 51 may be provided as an integral body. Modifications of the supporting mechanism that supports the vibrating portion 2-3 are obtained by adding the pins 8 and the leaf springs 51 and removing the leaf spring 45 to and from any of the configurations illustrated in FIGS. 3 to 10. In the second embodiment, the supporting mechanism that supports the vibrating portion 2-3 may include a member having a spring characteristic. Modifications of the supporting mechanism that supports the vibrating portion 2-3 also include a configuration obtained by simply adding the pins 8 to any of the configurations illustrated in FIGS. 3 to 10.

As described above, the vibration-type actuator according to the second embodiment includes the supporting mechanism functioning such that the reaction force from the base against the pressing force from the driven member to the elastic member is dispersed to the vibrating portion and the supported portion of the elastic member. Therefore, a separating force applied to a bonding layer provided between the elastic member and the piezoelectric element is smaller than in a supporting mechanism in which the reaction force acts only on the supported portion. Furthermore, the loss of vibrational energy is smaller than in a supporting mechanism in which the reaction force acts only on the vibrating portion. Furthermore, from the viewpoints of bond separation and the loss of vibrational energy, the best design of the reaction force acting on the vibrating portion and the supported portion is realized. Furthermore, since some of the members having spring characteristics concentratedly included in the supporting mechanism that supports the vibrating portion 2-3 in the first embodiment are dispersed to a mechanism that supports the supported portions 2-5, the height of the vibration-type actuator is reduced.

Although the second embodiment concerns a case where three vibrators are provided on the base, the present invention is not limited to such an embodiment. One or two vibrators or four or more vibrators may be provided on the base. Moreover, vibrators may be arranged such that the vibration-type actuator performs linear driving (in which the driven member undergoes a linear movement relative to the vibration-type actuator).

Third Embodiment

A third embodiment of the present invention will now be described with reference to FIGS. 14 and 15. In the third embodiment, the supported portions 2-5 of the flat-plate vibrator 1 are supported by the base 32 with vibration-isolating members 61 (see FIG. 14) or felt members 71 (see FIG. 15) as vibration-isolating elements interposed therebetween. The elastic member 2 according to each of the first and second embodiments is designed such that the transmission of the vibration occurring in the vibrating portion 2-3 to the supported portions 2-5 is suppressed by providing the connecting portions 2-4. Practically, however, some of the vibration may be transmitted to the supported portions 2-5. Consequently, depending on the method of supporting the supported portions 2-5, the loss of vibrational energy may increase. The third embodiment is suitable for a case where the high suppression of the loss of vibrational energy is required.

Figure 14:
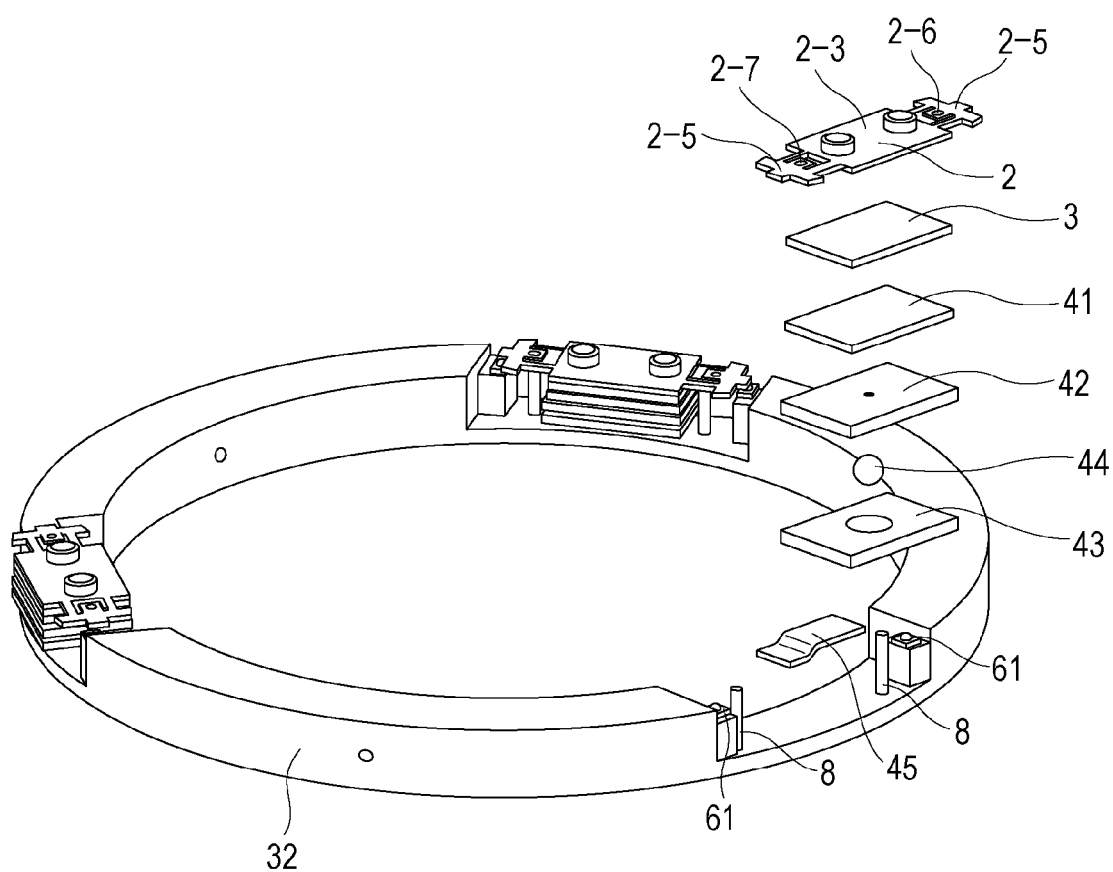
FIG. 14 illustrates yet another vibration-type actuator.

Referring to FIG. 14, the vibration-isolating members 61 have projecting portions, respectively, on the upper surfaces thereof and are fixed to the base 32. The projecting portions provide point supports at positions of the supported portions 2-5 where the vibration becomes minimum. Although each of the vibration-isolating members 61 illustrated in FIG. 14 has one projecting portion, the present invention is not limited to such an embodiment. Any number of projecting portions may be provided at any positions where the vibration becomes minimum. The positions where the vibration becomes minimum include not only positions where the vibration becomes exactly minimum but also positions where the vibration falls within a range including the minimum value and errors with respect thereto that may occur in the manufacturing process and during use. The circular hole 2-6 and the oblong hole 2-7 provided in the elastic member 2 are fitted onto the respective pins 8 standing from the base 32, whereby the position of the flat-plate vibrator 1 in the planar direction is regulated. Hence, the pins 8 function as position-regulating members that regulates the position of the elastic member.

Figure 15:
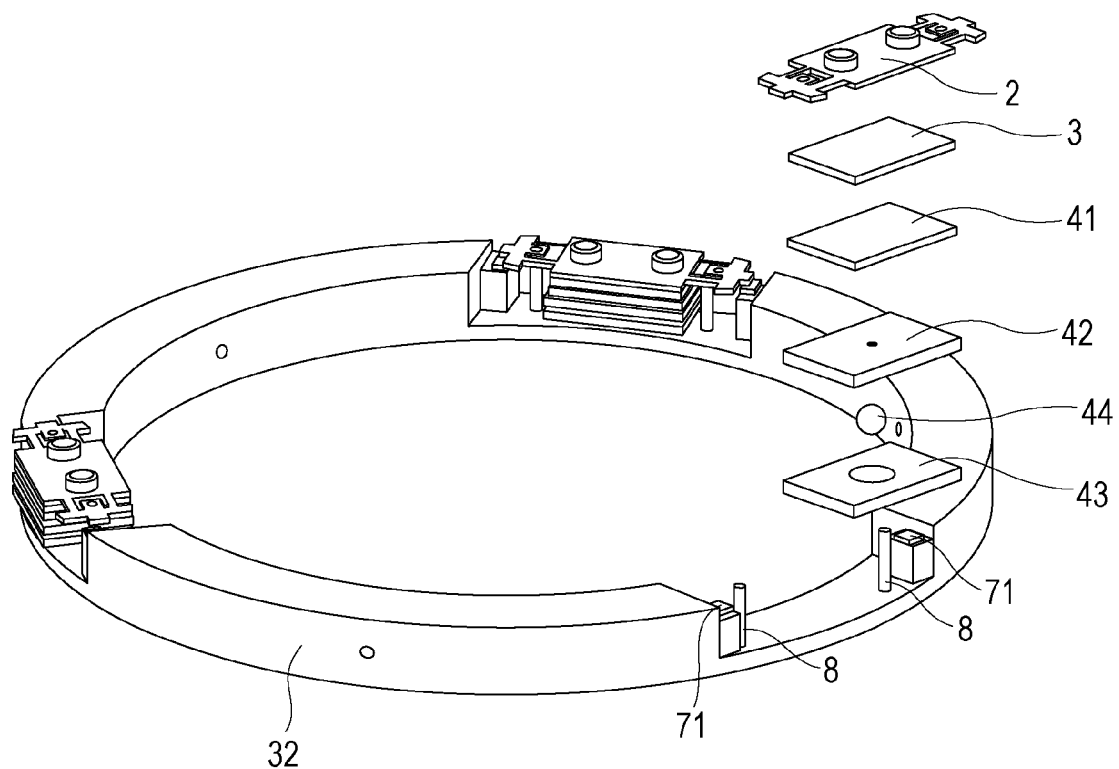
FIG. 15 illustrates yet another vibration-type actuator including a felt member as a substitute for a vibration-isolating member included in the configuration illustrated in FIG. 14.
Figure 16:
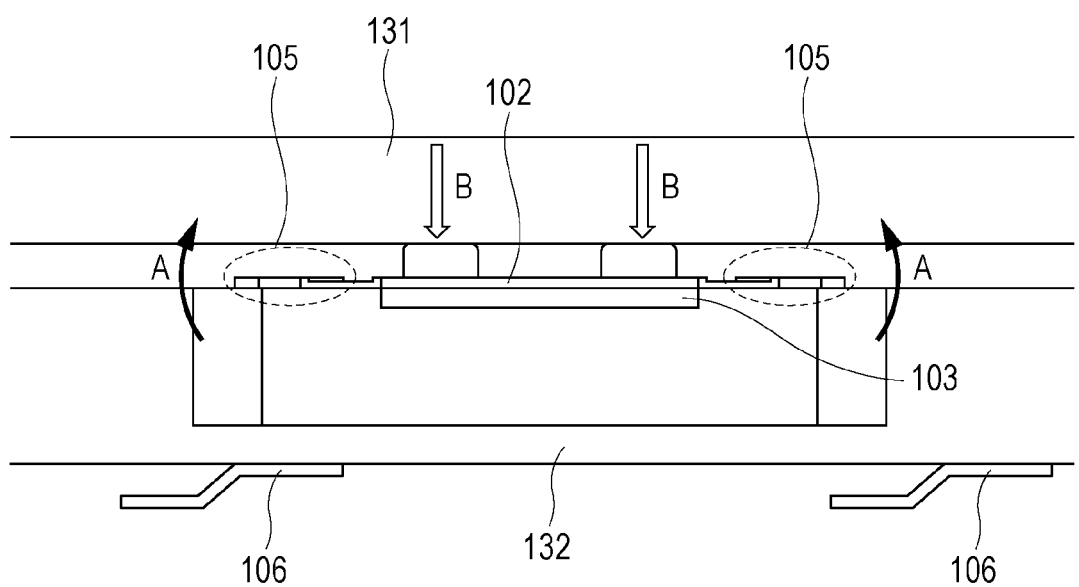
FIG. 16 illustrates a supporting mechanism included in a related-art flat-plate vibrator.

FIG. 15 illustrates a configuration in which the vibration-isolating members 61 are substituted by the felt members 71 that are interposed between the base 32 and the supported portions 2-5. The other elements are the same as those illustrated in FIG. 14, and detailed description thereof is omitted.

Modifications of the supporting mechanism that supports the vibrating portion 2-3 are obtained by adding the pins 8 and the vibration-isolating members 61 or the felt members 71 and removing the leaf spring 45 to and from any of the configurations illustrated in FIGS. 3 to 10, and by adding the pins 8 and the vibration-isolating members 61 or the felt members 71 to any of the configurations illustrated in FIGS. 3 to 10. Furthermore, both the vibration-isolating members 61 and the felt members 71 may be provided.

As described above, the vibration-type actuator according to the third embodiment includes the supporting mechanism functioning such that the reaction force from the base against the pressing force from the driven member to the elastic member is dispersed to the vibrating portion and the supported portion of the elastic member. Therefore, a separating force applied to a bonding layer provided between the elastic member and the piezoelectric element is smaller than in a supporting mechanism in which the reaction force acts only on the supported portion. Furthermore, the loss of vibrational energy is smaller than in a supporting mechanism in which the reaction force acts only on the vibrating portion. Furthermore, from the viewpoints of bond separation and the loss of vibrational energy, the best design of the reaction force acting on the vibrating portion and the supported portion is realized. Furthermore, the loss of vibrational energy that may occur because the vibrator is supported is reduced.

Although the third embodiment concerns a case where three vibrators are provided on the base, the present invention is not limited to such an embodiment. One or two vibrators or four or more vibrators may be provided on the base. Moreover, vibrators may be arranged such that the vibration-type actuator performs linear driving (in which the driven member undergoes a linear movement relative to the vibration-type actuator).

Fourth Embodiment

Figure 17:
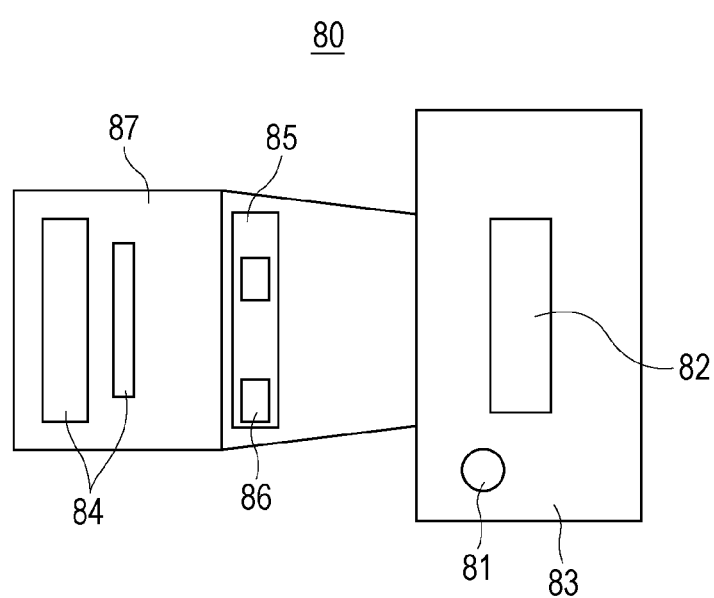
FIG. 17 illustrates an application of any of the vibration-type actuators.

An application of the vibration-type actuator according to any of the above embodiments will now be described with reference to FIG. 17. FIG. 17 is a conceptual top view of an image pickup apparatus. An image pickup apparatus 80 illustrated in FIG. 17 includes a camera body 83 and a lens barrel 87. The camera body 83 includes a power button 81 and an image pickup device 82. The lens barrel 87 includes lenses 84, a base 85, and a vibration-type actuator 86. The lens barrel 87 is an interchangeable lens unit and is interchangeable with any other interchangeable lens unit for the camera body 83 in accordance with an object of shooting.

The vibration-type actuator 86 may be any of the vibration-type actuators according to the first to third embodiments.

If any of the vibration-type actuators according to the first to third embodiments is included in the image pickup apparatus 80, there are provided a wide variety of material options for the adhesive to be provided between the elastic member and the piezoelectric element included in the vibration-type actuator, whereby a cost reduction is realized. Furthermore, since the loss of vibrational energy is reduced, the power consumption is reduced correspondingly.

Although FIG. 17 illustrates the image pickup apparatus 80 as an exemplary application of the vibration-type actuator according to any of the embodiments of the present invention, the vibration-type actuator according to any of the embodiments of the present invention is also applicable to the moving of a stage included in a microscope and other apparatuses. Such a stage is movable by the vibration-type actuator according to the present invention.

According to one aspect of the present invention, the vibration-type actuator functions such that the reaction force from the base against the pressing force from the driven member to the elastic member is dispersed to the vibrating portion and the supported portion of the vibrator. Therefore, a separating force applied to a bonding layer provided between the elastic member and the piezoelectric element is smaller than in a supporting mechanism in which the reaction force acts only on the supported portion. Furthermore, the loss of vibrational energy is smaller than in a supporting mechanism in which the reaction force acts only on the vibrating portion. Furthermore, from the viewpoints of bond separation and the loss of vibrational energy, the best design of the reaction force acting on the vibrating portion and the supported portion is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-155513, filed Jul. 11, 2012, which is hereby incorporated by reference herein in its entirety.

What is claimed is:

1. A vibration-type actuator comprising:
  an electromechanical energy conversion element;
  an elastic member including:
    a vibrating portion to which the electromechanical energy conversion element is bonded;
    a supported portion provided on a base; and
    a connecting portion connecting the vibrating portion and the supported portion to each other; and
  a first member having a spring characteristic and provided between the vibrating portion and the base,
  wherein the vibrating portion comprises a first projecting portion and a second projecting portion arranged in a direction,
  wherein the connecting portion is between the vibrating portion and the supported portion in the direction, and
  wherein the base is formed of one member.

2. The vibration-type actuator according to claim 1, wherein a reaction force from the base against a pressing force from a driven member to the vibrating portion is dispersed to the vibrating portion and the supported portion.

3. The vibration-type actuator according to claim 1, wherein the first member having a spring characteristic is a felt member.

4. The vibration-type actuator according to claim 2, wherein the first member having a spring characteristic is a spring.

5. The vibration-type actuator according to claim 4, wherein the spring is a leaf spring.

6. The vibration-type actuator according to claim 1, further comprising a second member having a vibration-isolating characteristic and provided between the vibrating portion and the base.

7. The vibration-type actuator according to claim 6, wherein the second member having a vibration-isolating characteristic is a vibration-isolating plate having a projection.

8. The vibration-type actuator according to claim 6, wherein the second member having a vibration-isolating characteristic is a felt member.

9. The vibration-type actuator according to claim 1, further comprising a third member having at least one of a spring characteristic and a vibration-isolating characteristic and provided between the supported portion and the base.

10. The vibration-type actuator according to claim 9, wherein the third member having at least one of a spring characteristic and a vibration-isolating characteristic is a felt member.

11. The vibration-type actuator according to claim 1, further comprising an equalizer configured to adjust orientations of the electromechanical energy conversion element and the elastic member with respect to a driven member, the equalizer being provided between the vibrating portion and the base.

12. The vibration-type actuator according to claim 1, further comprising a position-regulating member configured to regulate a position of the elastic member in a planar direction.

13. The vibration-type actuator according to claim 1, satisfying a relationship of $F3 \leq F1-F0$, where F1 denotes a pressing force applied from a driven member to the elastic member, F2 denotes a reaction force applied from the base to the vibrating portion, F3 denotes a reaction force applied from the base to the supported portion, and F0 denotes a lower limit of the reaction force F2 at which the electromechanical energy conversion element remains bonded to the vibrating portion.

14. The vibration-type actuator according to claim 1, wherein the vibrating portion is provided in a recess provided in the base.

15. An image pickup apparatus comprising:
an image pickup device;
a lens; and
the vibration-type actuator according to claim 1.

16. A stage movable by the vibration-type actuator according to claim 1.

17. A vibration-type actuator comprising:
an electromechanical energy conversion element;
an elastic member including:
  a vibrating portion to which the electromechanical energy conversion element is bonded;
  a supported portion provided on a base; and
  a connecting portion connecting the vibrating portion and the supported portion to each other; and
a felt member provided between the vibrating portion and the base, wherein the base is formed of one member.

18. The vibration-type actuator according to claim 17, wherein the vibrating portion is provided in a recess provided in the base.

19. An image pickup apparatus comprising:
an image pickup device;
a lens; and
the vibration-type actuator according to claim 17.

20. A stage movable by the vibration-type actuator according to claim 17.

* * * * *